Figure 2A:
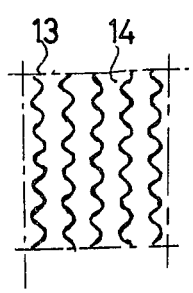

United States Patent [19]

Pielkenrood

[11] 4,113,629
[45] Sep. 12, 1978

[54] SEPARATION DEVICE PROVIDED WITH A COALESCENCE APPARATUS

[75] Inventor: Jacob Pielkenrood, Krommenie, Netherlands

[73] Assignee: Pielkenrood-Vinitex B.V., Assendelft, Netherlands

[21] Appl. No.: 662,838

[22] Filed: Mar. 1, 1976

Related U.S. Application Data

[63] Continuation of Ser. No. 527,583, Nov. 27, 1974, abandoned.

[51] Int. Cl.² .............................................. B01D 21/00
[52] U.S. Cl. ...................................... 210/522; 210/535
[58] Field of Search .................... 210/83, 84, 513, 519, 210/521, 522, 532, 535

[56] References Cited

U.S. PATENT DOCUMENTS

| | | | |
|---|---|---|---|
| 367,308 | 7/1887 | Macnab et al. | 210/521 |
| 2,134,113 | 10/1938 | Ehle | 210/532 |
| 2,413,375 | 12/1946 | Pomeroy | 210/49 |
| 2,883,059 | 4/1959 | Puddington et al. | 210/519 |
| 3,385,439 | 5/1968 | Bach | 210/83 |
| 3,419,145 | 12/1968 | de Celis | 210/84 |
| 3,552,554 | 1/1971 | Olgand | 210/521 |
| 3,666,111 | 5/1972 | Pielkenrood | 210/521 |
| 3,666,112 | 5/1972 | Pielkenrood | 210/521 |
| 3,706,384 | 12/1972 | Hane | 210/519 |
| 3,741,401 | 6/1973 | Hsiung | 210/519 |

FOREIGN PATENT DOCUMENTS

| | | | |
|---|---|---|---|
| 1,584,862 | 12/1970 | Fed. Rep. of Germany | 210/521 |
| 252,745 | 10/1948 | Switzerland | 210/521 |
| 17,980 of | 1896 | United Kingdom | 210/521 |
| 19,560 of | 1893 | United Kingdom | 210/513 |

*Primary Examiner*—Charles N. Hart
*Assistant Examiner*—Ernest G. Therkorn
*Attorney, Agent, or Firm*—George F. Smyth

[57] ABSTRACT

A separation device comprising a tank in which a plate separator assembly is positioned at an angle in respect to the horizontal plane. The tank is subdivided into a supply chamber and a discharge chamber by means of a transverse partition joining the oblique upper wall of the plate assembly near its lower edge. The partition and upper wall of the plate assembly define a triangular space, the supply for the liquid to be treated in the device opening into this space near its lowest point. A plurality of substantially vertical plates is arranged in this triangular space and defines a plurality of passages for the liquid flowing from the supply to the intake end of the separator plate assembly. The vertical plates bring about a transverse velocity gradient in the liquid flowing in these passages, causing coalescence of the particles suspended in the liquid.

6 Claims, 6 Drawing Figures

SEPARATION DEVICE PROVIDED WITH A COALESCENCE APPARATUS

This is a continuation of application Serial No. 527,583, filed Nov. 27, 1974, and now abandoned.

For separating components suspended in a carrier liquid, separation devices are known comprising, for instance, an inclined assembly of superposed, corrugated, plates defining therebetween passages for the liquid to be treated. In the passages, separation path length for the components to be separated is shorter, said components then being collected on the plates and sliding along said plates towards one of the extremities of the assembly.

The separation effect is dependent, inter alia, on the particle size. When the particles are too small an insufficient separation will take place at a sensible flow rate. In order to obtain a better separation of smaller particles, it is therefore, favorable to bring about particles, growth beforehand.

In Patent Application Ser. No. 353,543, filed Apr. 23, 1974, an now abandoned in favor of continuation Application Ser. No. 559,132, filed Mar. 17, 1975, there is a disclosure of structure for bringing about coalescence of particles suspended in a liquid, in which the liquid is guided through one or more substantially vertical channels. The walls of the structure cause a transverse velocity gradient in the liquid. Using that structure, particles with different velocities will overtake one another so that the agglomeration probability will be increased. Such auxiliary structures are apparently very effective, but have a disadvantage in that they need space. Consequently, and in particular with respect to existing separation devices, the provision thereof may be objectionable.

This invention provides a separation device, of the general type mentioned above, which is provided with such a coalescence apparatus which does not require additional space.

The separation device according to the invention may comprise a separation assembly which is positioned at a slope in a basin and is defined at its upper side by an oblique wall. The basin may, furthermore, be subdivided into two chambers by means of a partition, the lower side of which joins said oblique wall. The device may also include an assembly of plates arranged in the triangular space between the oblique wall and the partition, substantially vertical passages being defined between said plates in which the coalescence mentioned above can take place. These plates can have various shapes and, particularly, may define coalescence channels in which the liquid is allowed to flow alternately upwardly and downwardly. In particular means can be provided for controlling the velocity gradient in at least a part of these passages.

Figure 1:
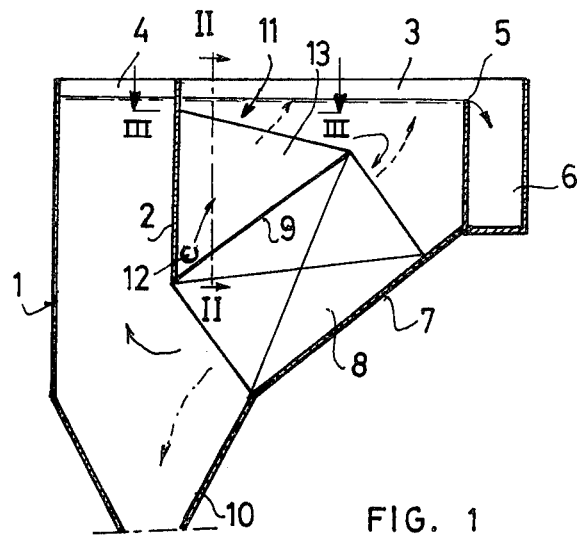
Figure 2B:
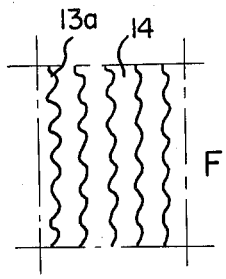
Figure 2C:
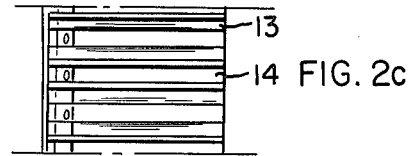
Figure 3:
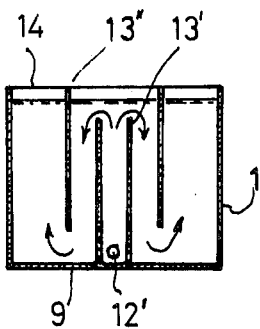
Figure 4:
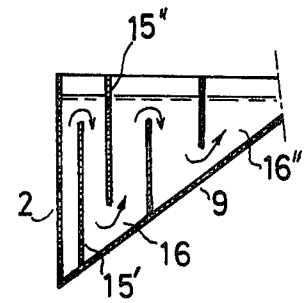

The invention will be elucidated below by reference to a drawing, showing in:

FIG. 1, a schematic cross-section of a device according to the invention;

FIG. 2a, a partial cross-section on line II—II of FIG. 1 of an embodiment of this device in which flow-path defining corrugated plates are in phase opposition;

FIG. 2b, a view similar to FIG. 2a in which the plates are in phase coordination;

FIG. 2c, a partial cross-sectional view of the coalescence stimulator of either FIGS. 2a or 2b, as seen along a line III—III of FIG. 1;

FIG. 3, a partial cross-section, corresponding to FIG. 2, of another embodiment; and FIG. 4, a partial cross-section, corresponding to FIG. 1, of still another embodiment.

The separator shown in FIG. 1 comprises a basin 1 which is, by means of a partition 2, divided into two chambers 3 and 4, an overflow weir 5 being arranged in the chamber 3 allowing the lighter components floating on the liquid in the chamber 3 to flow off towards a discharge duct 6. In the chamber 3 and on the oblique wall 7 of the basin 1, a separation assembly 8 of the usual kind, not shown in detail, is provided, said assembly comprising a plurality of parallel plates, and being defined at its upper side by an oblique wall 9. The oblique plates of this assembly which, in particular, may be corrugated, define separation passages communicating at the higher end with the chamber 3, and, at the lower end, with the chamber 4, the latter chamber connecting at its lower side with a collecting space 10 for sedimentating components.

The oblique upper wall 9 of this assembly defines, together with the partition 2, a coalescence chamber 11, which is generally triangular in vertical cross-section, in the illustrated example, within the chamber 3. In the lower part of coalescence chamber 11, a supply tube 12 is provided, extending across the whole width of this space, which tube is provided with a slot or with separate openings through which the liquid supplied by this tube can be directed into the chamber 11. Thus, since the fluid enters the chamber 11 at an apex thereof, as seen in FIGS. 1 and 2c, and moves through a uniformly increasing volume (i.e., increasing cross-sectional area), it is apparent that the maximum fluid velocity will occur at the chamber apex. The fluid velocity will decrease uniformly as the fluid moves toward the side of the triangular volume opposite the apex at which pipe 12 is located, since the enlargement of the cross-sectional area of the apparatus is uniform.

In the space 11 mutually parallel plates 13 are arranged. The liquid emerging from the tube 12 flows upwardly through the passages 14 (FIG. 2) between these plates 13 and, because of the friction against these plates, a transverse velocity gradient will be generated in the liquid. As a consequence of the velocity differences thus generated, the particles suspended in the liquid will overtake one another and can agglomerate or coalesce. Since the flow cross-section in the passages 14 gradually increases upwardly, the flow velocity will gradually decrease. This is favorable as, at a gradual particle growth rate, the risk increases that the particles will be disrupted again by shearing forces between adjacent liquid layers. With a decreasing flow velocity this risk decreases accordingly. Moreover, at a lower velocity, the residence time of the particles in the chamber 11 will increase. At the lower velocity gradient, this increase is favorable since it increases the probability of particle growth in the chamber.

As previously disclosed in U.S. Application Ser. No. 353,543, filed Apr. 23, 1973, now abandoned in favor of continuation application Ser. No. 559,132, filed Mar. 17, 1975, the plates 13 may, in particular, be corrugated, with the crests and valleys generally perpendicular to the upward flow path of the fluid (indicated by the arrow leading from tube 12 in FIG. 1) as shown in FIGS. 1 and 2. As shown in FIG. 2a, the corrugations of adjacent plates 13 may be in phase opposition, i.e., the crests of adjacent plates are directly opposite one another. Thus, the intermediate passages between adjacent plates have alternately narrowed and widened portions. Consequently, both transverse and longitudinal velocity differences may be generated in the moving fluid, providing an additional stimulation of particle growth.

As shown in FIG. 2b, the corrugated plates 13a may, if desired, be brought into phase or placed in phase coordination, i.e., the crests in each plate are directly opposite the valleys in the adjacent plates. This readjustment of the plate position by one-half a wave length causes the width of flow passages 14a between adjacent plates to be constant throughout their length. Thus, velocity gradients or differences are generated just as they are with flat plates, but the path length is increased slightly. Since the fluid in the path will repeatedly change direction due to the corrugations, additional velocity gradients will be created and the particle growth effect will be greater than with flat or non-corrugated plates.

FIG. 3 shows another arrangement in which a part of the plates 13′ extends as far as the oblique wall 9 but not as high as the normal liquid level in the chamber 11, and the remaining plates 13″ extend upwards beyond the liquid level but remain at some distance from the wall 9. The intermediate passages 14 constitute in this manner an alternately upward and downward flow path for the liquid. In the present case the liquid supply takes place between the central plates 13′, and the liquid is then laterally subdivided into two branches, but it is, of course, also possible to arrange the supply chamber at the lateral side. The width of the passages 14 can be made larger towards the outside, as described in the above-mentioned prior patent application, so as to obtain an accordingly lower flow velocity, and thus to reduce the risk of disruption of grown particles.

The plates 13′ and 13″ according to FIG. 3 are plain but can also be made corrugated as shown in FIG. 2. It is also possible to provide, in the manner described in the above-mentioned prior patent application, auxiliary plates by means of which the passages 14 are subdivided into partial passages connected in parallel, in which the velocity gradient is accordingly higher, which plates, in particular, can be made adjustable and can be plain or corrugated. These plates can, moreover, be directed either parallel to the plates 13 or, respectively, 13′ and 13″, or transversely thereto.

FIG. 4 shows another embodiment in which, instead of triangular plates according to FIG. 3, plates 15′ and 15″ are positioned substantially parallel to the partition 2. The plates 15′ extend as far as the oblique wall 9 but not as high as the normal liquid level, and the plates 15″ extend above the liquid surface but remain at some distance from the wall 9. In this manner passages 16 are obtained, again forming alternately upwardly and downwardly directed flow paths, and, in particular, the width of these passages increases so as to reduce the flow velocity accordingly. The last passage 16″ is defined by a plate 15″ and the oblique wall 9 and is, therefore, increasing in width. Also in this case additional plates can be arranged in the passages for raising the velocity gradient.

The liquid flowing from the supply tube 12 or a similar supply means flows through the different passages 14 or 16 in which, as a consequence of the transverse velocity gradient, coalescence of suspended particles can occur. If these particles are lighter than the carrier liquid, a part thereof will float in the chamber 3, and the remaining particles will be entrained by the liquid towards the intake of the assembly 8. In this assembly a further separation of lighter components will take place, which, then, will flow back towards the chamber 3, and the particles which are heavier than the carrier liquid will flow toward the lower end from the assembly 8 and arrive in the space 10. The clarified carrier liquid flows upwards into the chamber 4 and is discharged from there in some suitable manner.

If necessary air (and in particular colloidally dispersed air) and/or other separation promoting agents can be introduced into the lower end of the coalescence chamber 11 near the tube 12 or in this tube. In the case of FIG. 4 the plates 15″ are shaped in such a manner that floating components already separated in the passages 16, which will then float on the liquid, can flow off towards the chamber 3. In the case of the plates 13 and 13″ this can take place without additional measures since these plates do not impede the removal of these floating components.

Within the scope of the invention many modifications are possible.

I claim:

1. A separation device incorporating a coalescence apparatus to enhance the efficiency of separation without substantially increasing the space occupied by the separation device, comprising:
    a basin having a partition extending transversely across it to define a supply chamber and a discharge chamber;
    a parallel plate separator having an intake end in said supply chamber and having an outflow end opening into said discharge chamber, said separator defining a passage for liquid flow from said supply chamber to said discharge chamber, said separator having an upper wall extending with an upward inclination from said vertical partition to the intake end of said separator to define an upwardly diverging wedge-shaped space in said supply chamber above said separator;
    parallel plate coalescence apparatus situated in said wedge-shaped space above said separator;
    supply means opening into a lower portion of said wedge-shaped space near its vertex, and supplying liquid to said coalescence apparatus, said coalescence apparatus communicating with said supply chamber so as to require the liquid supplied by said supply means to pass through said coalescence apparatus prior to entering said supply chamber;
    said coalescence apparatus promoting particle growth in the liquid supplied by said supply means so as to enhance the effeciency of said separator; and, an outlet for removing the particles from the base of said discharge chamber and an outlet for removing clarified liquid from said discharge chamber.

2. The separation device of claim 1 wherein said coalescence apparatus further comprises spaced substantially parallel plates defining flow paths between them for the liquid, said plates operative as the liquid flows between them to reduce the velocity of the liquid adjacent said plates so as to produce in the liquid a velocity gradient transverse to the flow paths.

3. The separation device of claim 2 wherein some of said plates are corrugated and are oriented with the corrugations extending substantially perpendicularly to the flow paths so as to produce in the liquid as it flows between said plates velocity gradients in the direction of the flow.

4. The separation device of claim 2 wherein each of said plates includes a first edge connected to said partition and a second edge connected to the upper wall of said separator, said first edge and said second edge diverging from the intersection of said partition and the upper wall of said separator so that the cross sections of the flow paths increase in the direction of flow.

5. The separation device of claim 4 wherein said plates are arranged so as to reverse the direction of flow at least twice.

6. The separation device of claim 2 wherein said plates are oriented substantially parallel to said partition and are spaced so that the cross section of the flow paths increase in the direction of flow.

* * * * *